United States Patent

Wieder

[11] 4,187,475
[45] Feb. 5, 1980

[54] CONTINUOUSLY VARIABLE LASER OUTPUT COUPLER

[75] Inventor: Irwin Wieder, Los Altos, Calif.

[73] Assignee: Analytical Radiation Corp., Los Altos, Calif.

[21] Appl. No.: 867,005

[22] Filed: Jan. 5, 1978

[51] Int. Cl.² ............................................. H01S 3/08
[52] U.S. Cl. ........................ 331/94.5 S; 331/94.5 C; 350/288
[58] Field of Search .................... 331/94.5 C, 94.5 D, 331/94.5 M, 94.5 S; 350/164, 315

[56] References Cited

U.S. PATENT DOCUMENTS

| | | | |
|---|---|---|---|
| 3,569,856 | 3/1971 | Ridgway | 331/94.5 C |
| 3,621,459 | 11/1971 | Reeves | 331/94.5 C |
| 3,626,322 | 12/1971 | Strouse et al. | 331/94.5 C |
| 3,747,021 | 7/1973 | Smiley | 331/94.5 C |
| 4,132,959 | 1/1979 | Bouwhuis et al. | 350/164 |

Primary Examiner—William L. Sikes

[57] ABSTRACT

The output power of any laser is optimized by providing an output mirror with a transmission which varies as a function of position on the mirror and transmitted wavelength. The transmission which corresponds to the optimum output for a given laser wavelength is chosen by monitoring laser output and moving the output mirror in at least one direction essentially perpendicular to the laser beam axis while maintaining the orientation of its reflecting surface perpendicular to the laser beam axis, and locating the mirror position corresponding to optimum laser output.

12 Claims, 6 Drawing Figures

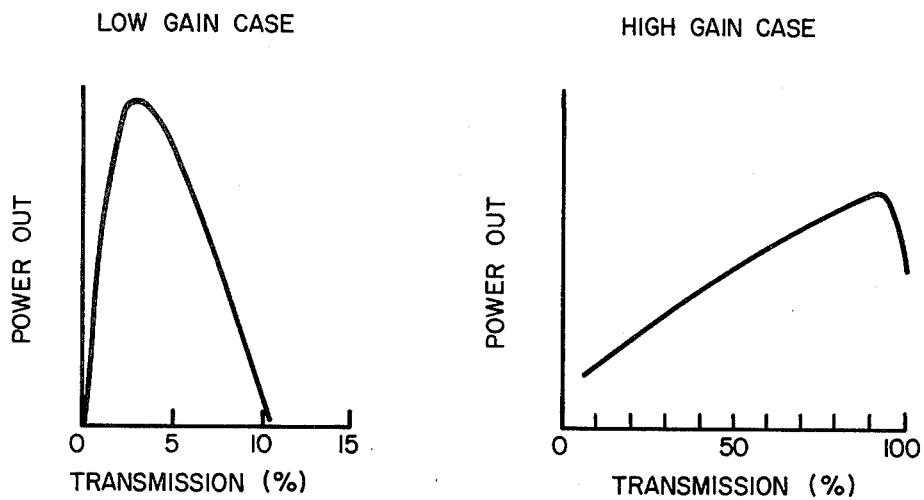
FIG_1A
FIG_1B
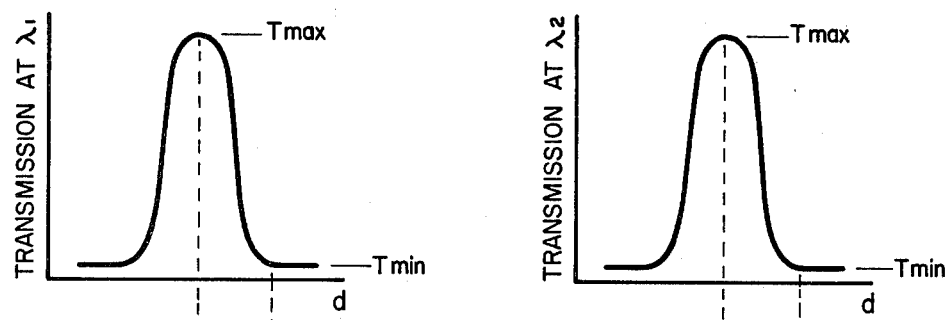
FIG_2B
FIG_2C
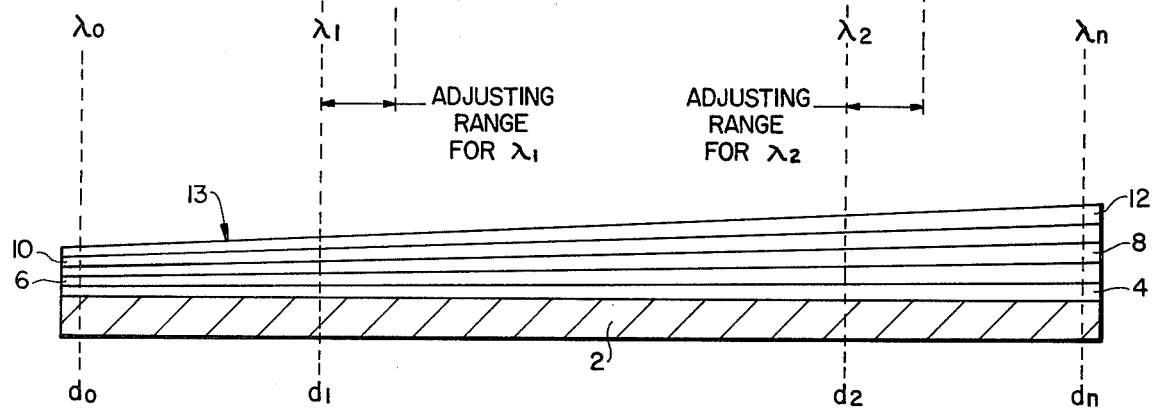
FIG_2A

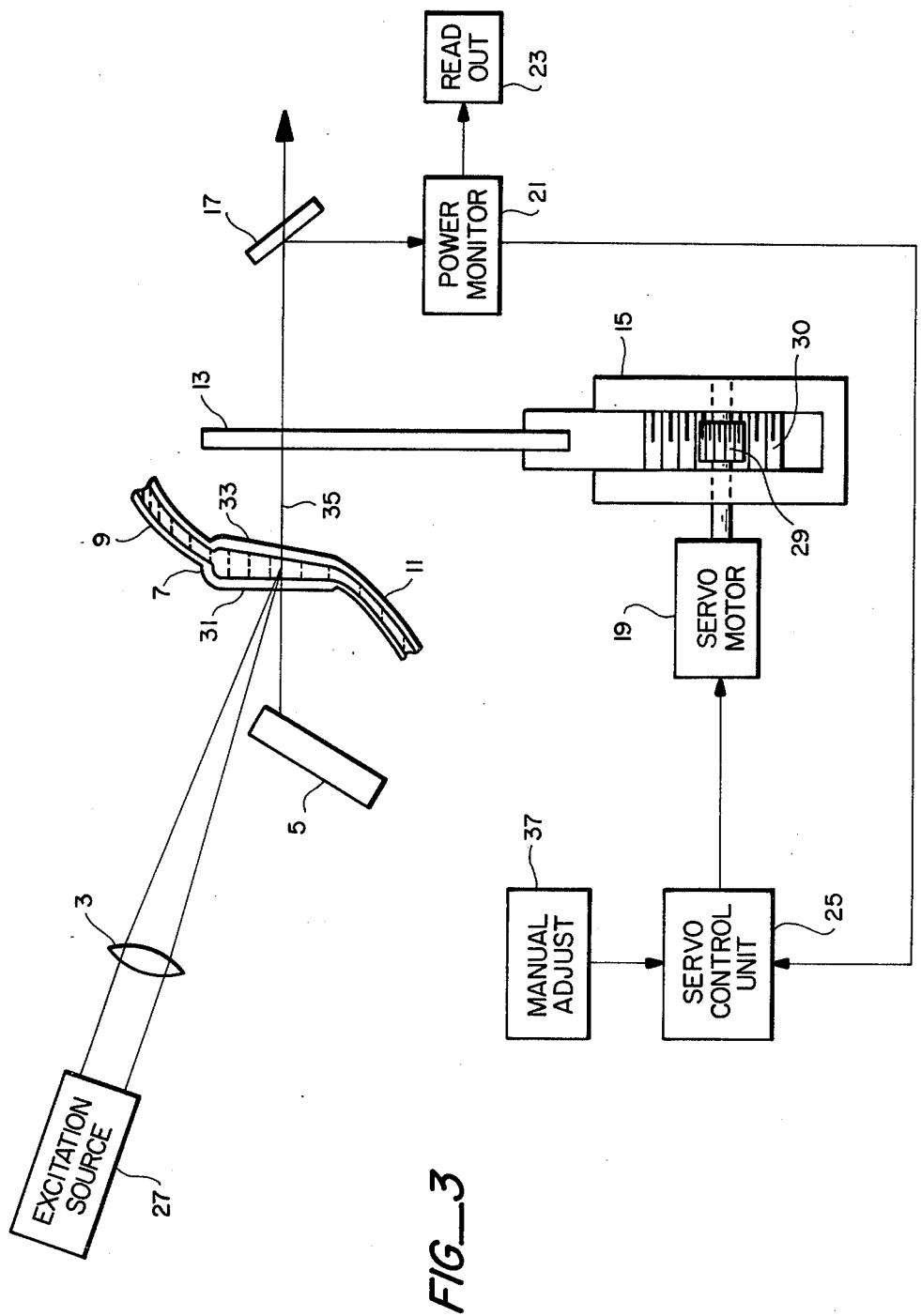
FIG_3

CONTINUOUSLY VARIABLE LASER OUTPUT COUPLER

BACKGROUND OF THE INVENTION

The invention relates to laser output couplers and more particularly to a mirror output coupler. Tunable lasers are of special interest, because by using wavelength sensitive elements within the laser cavity, a virtual continuum of laser wavelengths can be generated. This is of great practical value as it extends the possibility of laser illumination to virtually any wavelength of interest. In general, for tunable lasers, the optical gain within the laser medium is a function of wavelength. Of the two mirrors which form a laser cavity, the back mirror is usually of maximum reflectance, while the output mirror has a transmission usually picked to optimize laser output.

It is also well known in the laser art that the laser output is a function of optical gain, mirror reflection coefficients and system losses. Because of this functional dependence, for a given set of laser parameters, and for a particular wavelength, there is an optimum transmission coefficient for the output mirror which maximizes output. In terms of a simplified laser model, this means that optimum coupling is achieved as a balance of two considerations: on the one hand, it is desirable to have as low a transmission as possible (highest reflectivity) on the output mirror in order to build up as much energy as possible in the light waves traveling back and forth in the laser, and on the other hand, the higher the transmission of the output mirror, the higher the fraction of light which escapes the cavity as output for each reflection.

If the output power of a laser with fixed gain in the laser medium, fixed losses, and a perfect back mirror ($\sim$100% reflectivity) is plotted against transmission of the output mirror, a curve is obtained which starts near zero, rises to a peak level at optimum transmission, and falls again towards zero. Lasers are usually designed and operated near the maximum of such a curve. However, since the gain of a tunable laser typically varies as a function of wavelength, it is not possible in the case of tunable lasers to use one transmission value to optimize output coupling for different wavelengths.

Solutions to this problem have been varied. In some cases, workers have used a series of mirrors to cover different wavelength ranges. In other cases, broad band mirrors have been used with reflectivity characteristics chosen to attempt to match the needed reflectivity at most wavelengths. These methods have met with some degree of success, but do not provide continuously variable output coupling for each wavelength.

At least two previous methods to provide continuously variable output couplers are known. In the first method, described in U.S. Pat. No. 3,448,404, a Brewster window and a total reflector at 90 degrees are combined to provide variable output coupling from inside the laser cavity. In the second method, described in U.S. Pat. No. 3,624,546, two totally reflecting mirrors at 90 degrees to each other are used to define a variable gap with a resultant variable output coupling. These two methods suffer from certain disadvantages. The first is that they both require extra optical components in addition to the two normally used for cavity resonators. Further, in the first method, the output coupler is inside the laser cavity and requires an extension of the distance between the cavity resonators. For very short pulse lasers, it is important that the laser resonators be as close as possible to each other. Also, in the second method, the output coupling hole is not circularly symmetric, which leads to a non-circularly symmetric output beam.

Accordingly, it is an object of the present invention to devise a continuously variable output coupler with a minimum number of optical components, and which is consistent with a short cavity and gives an essentially circularly symmetric output beam.

SUMMARY OF THE INVENTION

This objective is accomplished in accordance with the invention by providing an optical wedge filter as the output mirror of the laser cavity. This output wedge is mounted perpendicular to the laser beam axis and in a mechanical assembly which allows for translation of the wedge filter in the plane of the filter and along a thickness gradient while keeping the plane orientation fixed. Output is monitored and the position of the wedge which corresponds to maximum output is located.

A characteristic of this invention is that output is maximized by translation of an output mirror which has the property of a transmission value which depends on the particular part of the mirror used.

The above and other objects of the invention can be more easily understood from the following more detailed descriptions and drawings.

BRIEF DESCRIPTION OF THE DRAWINGS

FIGS. 1A and 1B show plots of laser power out versus transmission for a low gain laser and a high gain laser.

FIG. 2A is a schematic diagram of the optical wedge filter.

FIGS. 2B and 2C are transmission curves for a particular wavelength in different locations along the filter.

FIG. 3 is a schematic view of an embodiment using the optical wedge filter as an output coupler in a short tunable cavity.

DESCRIPTION OF THE PREFERRED EMBODIMENTS

In the present invention, we are concerned with the optimization of the output of lasers by varying the transmission of the output mirror. A plot of relative output power versus output mirror transmission is shown in FIG. 1A for a low gain case such as a he-ne laser, and in FIG. 1B for a high gain case such as a pulsed nitrogen laser. It can be seen that for low gain, the output power peaks for an output transmission of a few percent, while for an extremely high gain laser, the output peaks for a transmission near 90%. It is thus clear that a range of different transmission values are needed to optimize laser outputs whenever the laser medium gain can vary.

In FIG. 2A, a typical wedge transmission filter is shown. The wedge substrate 2 is typically flat and usually made from quartz or glass or a material which is transparent at all laser wavelengths of interest. Thin dielectric layers 4, 6, 8, 10 and 12 of materials of low and high dielectric constant are alternately deposited on the substrate in such a way that the thickness of each layer increases linearly from one end to the other. The wedge filter shown in FIG. 2A is a schematic representation of an actual wedge filter. Operational interference filters may have ten or more layers of alternating different thicknesses depending on bandwidth and peak transmission requirements, and the dielectric constants of the two alternating materials. Details on the design of ordinary interference filters are available in standard text books such Optical Properties of Thin Films, by O. S. Heavens, Dover 1965. A wedge filter is an ordinary interference filter as described by Heavens, with the modification that the thickness of each dielectric layer increases linearly along a certain direction. The ratio of the thicknesses of alternating layers remains constant along the thickness gradient direction. The successful manufacture of wedge filters has been accomplished by many commercial firms, such as Spectra Physics, Mountain View, Calif., and Optical Coating Labs., Santa Rosa, Calif. These wedge filters are normally used as devices for isolating various wavelength ranges of a continuous output spectrum.

Returning now to the wedge filter in FIG. 2A, if the relative thicknesses are properly chosen, as is well known in interference filter art, then, at any point, $d_1$, along the long axis of the filter, and when viewed perpendicular to the filter plane, the transmission characteristics as a function of wavelength will be a transmission peak centered at $\lambda_1$. Similarly, when viewed at $d_2$, a transmission peak at $\lambda_2$ is observed as a function of wavelength. Thus, the wedge filter is effectively a continuum of miniature transmission filters adjacent to each other and each one having a central wavelength slightly longer than its neighbor to its left and slightly shorter than the neighbor on its right. A corollary property of the wedge filter is that for a fixed wavelength, at, say, $\lambda_1$. the transmission for the filter at $\lambda_1$ is a function of position along the wedge and reaches a maximum, $T_{max}$ at $d_1$, decreasing as shown in FIG. 2B to a minimum transmission, $T_{min}$, on either side of $d_1$. Similarly, as shown in FIG. 2C, for a wavelength fixed at $\lambda_2$, there is a corresponding point, $d_2$, for maximum transmission with decreasing values of transmission on either side of $d_2$.

If a laser is operating at $\lambda_2$, then if the filter is adjusted so that the laser beam strikes position $d_2$, the maximum transmission possible will be found. By shifting the filter so that the laser beam strikes greater or lesser d's, the transmission at $\lambda_2$ can be continuously adjusted from $T_{max}$ to $T_{min}$ in the adjusting range for $\lambda_2$ as shown in FIG. 2C.

In actual operation, the laser may be a short cavity pulsed dye laser as shown in FIG. 3. Here the laser cavity consists of a reflection grating 5 and the wedge filter 13. The laser dye is flowed through a dye flow cell 7 which has two transparent faces 31 and 33. These two faces are transparent to both pump light and laser beam output, although face 33 need be transparent only to laser beam output, and are deliberately made non-parallel to avoid lasing between the two cell faces. A dye reservoir and dye pump for flowing dye through the cell via connecting hoses 9 and 11 are not shown. The excitation source 27 may be a pulsed longitudinally excited nitrogen laser, or other high power short pulse laser, and is focussed on the dye medium within the flow cell 7 using focussing lens 3.

This short cavity configuration is tunable by rotating grating 5 around an axis perpendicular to the plane of FIG. 3 and is described in more detail in "Longitudinal Excitation of a Short Cavity Tunable Dye Laser by a Nitrogen Laser", G. Neumann and I. Wieder, Optics Comm. 5, 197, 1972. In accordance with the results of the above reference, care must be taken to avoid forming a laser cavity between the cell faces 31 or 33, and either the reflection grating 5 or the wedge filter 13. This is usually accomplished by keeping the faces 31 and 33 at a slight angle, 1 degree or so with respect to the laser beam axis 35.

The output mirror is just the wedge filter 13 held in a plane perpendicular to the output beam by guiding means 15 and with the particular position which is exposed to the laser beam adjusted by translating the filter in a direction along the filter. While FIG. 2A depicts an exaggerated wedge shape, the actual thickness change for a wedge filter may be only a few thousand angstrom units from one end to the other. The corresponding angle of the wedge may be about $10^{-5}$ radians or on the order of one second of arc. Thus, the orientation of the wedge in a direction perpendicular to the laser beam is essentially true for all the layers.

The laser output is monitored by a beam splitter 17 which takes off a small portion of the beam and directs it to a power monitor 21 which is typically a photo detector. Signals from the power monitor 21 are then divided between read out unit 23 and servo control unit 25.

In actual operation, the filter 13 may be manually moved by manual adjust circuit 37 coupled to servo control unit 25 to maximize the output power of the tunable laser at each wavelength by observing the read out 23 from the power monitor 21 and adjusting for maximum. As an alternative, once optimum is set for a particular wavelength and the wavelength of the laser varied, the servo control unit 25 may be programmed to automatically hunt for the new maximum. This can be accomplished for example by programming the control unit to seek a position of zero slope in the output power variation, as a function of the position of wedge 13.

After a wavelength change, which occurs when grating 5 has been rotated to a new position corresponding to a new wavelength, there is in general a change in the laser medium gain and a corresponding need for a change in the transmission of the output mirror 13 for optimum output coupling.

The output monitor 21 will then signal a change in output level, and this change signals the servo control unit 25 to start hunting for a new output maximum. This is accomplished by sending signals to servo motor 19 which rotates and causes pinion 29 to rotate shifting the position of rack 30 and filter 13 which is rigidly attached to rack 30. Housing 15 maintains the orientation of filter 13 during this translation and the servo control unit 25 is programmed to stop when maximum output is reached.

The system described here for optimizing the output of a tunable laser may also be used to control the power output to a constant value. Instead of maximizing the power output for each new wavelength position, it may sometimes be desirable to program the control unit to adjust the wedge filter to a preset level, thus providing a constant output tunable laser.

In that case, operation is essentially the same except that the output monitor signals are compared with a preset internal reference and hunting is automatically stopped when laser output reaches this preset level.

While we have described a system with a linear wedge filter translated in a linear direction for optimizing laser output, other geometries are possible. For example, wedge filters are known which are constructed in the form of a circle. In that case, the gradient of thickness lies in a circular direction and laser output power is optimized by rotating the circular filter around an axis perpendicular to the wedge plane and through the center of the circle defining the gradient.

While the above described system uses a pulsed dye laser, it is understood that the method is applicable to any tunable laser or any laser in which the laser medium exhibits different gain from time to time or when variable gain is an integral part of its use.

I claim:

1. A method for optimizing the output of a laser comprising:
   providing as part of a laser cavity an output mirror with a range of transmission values, said transmission values varying in a known way as a function of wavelength and position along a gradient,
   monitoring the output power of said laser, and
   moving said output mirror along a gradient in the plane of said output mirror so that said plane remains essentially perpendicular to the laser beam axis, and until said monitored output power is optimized.

2. The method of claim 1 wherein said output mirror is a linear filter wedge with a thickness gradient of dielectric layers along a linear axis.

3. The method of claim 1 wherein said output mirror is a circular filter wedge with a thickness gradient of dielectric layers along a circumference of said wedge.

4. A method for stabilizing the output power of a laser, said method comprising:
   providing as part of a laser cavity an output mirror with a range of transmission values, said transmission values varying in a known way as a function of wavelength and position along a gradient,
   monitoring the output power of said laser, and,
   moving said output mirror along a gradient in the plane of said output mirror so that said plane remains essentially perpendicular to the laser beam axis, and until said monitored output power is stabilized to a predetermined level.

5. The method of claim 4 wherein said output mirror is a linear filter wedge with a thickness gradient of dielectric layers along a linear axis.

6. The method of claim 4 wherein said output mirror is a circular filter wedge with a thickness gradient of dielectric layers along a circumference of said wedge.

7. A laser apparatus comprising:
   an active laser medium having pumping means operatively associated therewith,
   an optical resonator disposed about said laser medium, said resonator including at least one output mirror for transmitting an output beam wherein the output mirror of said optical resonator is a wedge filter having servo controlled mechanical means supporting said wedge filter, said mechanical means for moving said wedge in a direction in the plane of said wedge and along a thickness gradient of said wedge, said mechanical means maintaining the orientation of said plane of said wedge essentially perpendicular to said output beam of said laser, and,
   means disposed in the path of the output beam for monitoring the output of said laser, said monitoring means generating a control signal electrically transmitted to said servo for controlling the position of said wedge filter.

8. The laser apparatus of claim 7 wherein said optical resonator includes a frequency tunable element other than said wedge filter.

9. The laser apparatus of claim 8, wherein said frequency tunable element other than said wedge filter is a reflection grating.

10. The laser apparatus of claim 7 wherein said laser medium has variable gain.

11. The apparatus of claim 7 wherein said servo means is adapted to hunt for maximum beam output.

12. The apparatus of claim 7 wherein said servo means is adapted to hunt for a preset level of beam output.

* * * * *